July 16, 1957     B. H. SCHULTZ ET AL     2,799,807
NEUTRAL GROUNDING DEVICE

Filed May 28, 1953     2 Sheets-Sheet 1

INVENTORS
Blaine H. Schultz
Peter M. Minder
BY
Attorney

July 16, 1957 B. H. SCHULTZ ET AL 2,799,807
NEUTRAL GROUNDING DEVICE
Filed May 28, 1953 2 Sheets-Sheet 2

INVENTORS
Blaine H. Schultz
Peter M. Minder
BY
Charles A. Crudell
Attorney

United States Patent Office 2,799,807
Patented July 16, 1957

2,799,807
NEUTRAL GROUNDING DEVICE

Blaine H. Schultz, South Milwaukee, and Peter M. Minder, Milwaukee, Wis., assignors to McGraw-Edison Company, a corporation of Delaware Application May 28, 1953, Serial No. 357,996

9 Claims. (Cl. 317—12)

This invention relates to a protective system for electrical apparatus and particularly to protection of a plurality of Y-connected capacitor banks connected in parallel with each other across a polyphase electric circuit.

The placement of Y-connected, grounded, capacitor banks in a three-phase electric circuit with a grounded neutral reduces the zero-sequence impedance for a certain frequency range, thereby causing higher harmonic currents to flow in the neutral.

Harmonics are created in generators, transformers, and system loads. Once they exist, the capacitor provides an easy path for the flow of the currents created by harmonic voltages. These harmonic currents will increase the Kvar. of the capacitor and although usually harmless, they should not constitute more than 35% of the fundamental Kvar. rating of the capacitor.

A grounded neutral becomes an active return path for harmonic and unbalance currents. Some of these neutral currents can cause considerable inductive interference on adjacent communication lines.

Zero-sequence current flow in the capacitor bank can be eliminated if the neutral of the bank is normally ungrounded. This arrangement would be satisfactory except for the destructive factor in the event of a fault in one of the capacitors. If the neutral is not grounded, a fault in a capacitor unit usually would not increase the line current sufficiently to blow the main bank fuses and the resulting over voltages on the other phases would be excessive and would damage the remaining capacitors in the bank.

An attempt has been made to protect unfaulted capacitors of a bank by placing a spark gap between the bank neutral and ground so that in the event a fault occurred in any capacitor unit, the neutral would assume phase to ground voltage and spark over would take place in the gap. Thus, a phase to ground fault would occur and the fuse between the faulted capacitor and its corresponding line would rupture and remove the capacitor from that line. The disadvantage of this system was that if one phase were momentarily opened as for instance during the operation of other protective equipment, the spark gap would function also. Of course, unnecessary grounding of the floating neutral of the capacitor bank would result.

With our novel apparatus, unnecessary grounding is avoided. At the same time when a fault does occur in one capacitor, that particular phase in which the faulty capacitor is located is removed electrically from the remaining capacitors, thus preventing their unnecessary destruction.

The object of this invention is to provide means for protecting a plurality of polyphase star-connected capacitor banks having a common neutral which is normally ungrounded.

Another object of this invention is to provide an arrangement for normally maintaining a plurality of star-connected capacitor banks with their common neutral normally ungrounded, and in the event of the failure of an individual capacitor in any of the banks, means for grounding the neutrals of the bank, thus protecting the unfaulted capacitors against damage.

A further object of this invention is to provide in this system a means which in the event of the failure of a single capacitor will not subject the remaining capacitors to excessive overvoltages.

It is also an object of this invention to provide in such a system a protective device that will not ground the neutral of said capacitors in the event that one phase of the distribution system is momentarily or permanently interrupted due to reclosure or fuse cutout operations.

Specifically, it is the object of this invention to provide a grounding means for the ungrounded neutrals of a plurality of Y-connected capacitor banks operative to cause the fuse in the faulted phase to rupture thereby disconnecting that phase from the other capacitors.

Other objects will appear from time to time in the course of the specification and claims.

We illustrate this invention more or less diagrammatically in the accompanying drawings in which.

Figure 1:
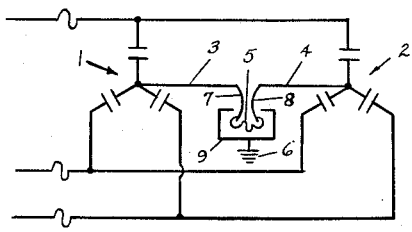
Fig. 1 is an electrical diagram illustrating a method of grounding the neutrals of a plurality of Y-connected capacitor banks.

Fig. 1 is a diagrammatic sketch of one manner of achieving our objectives and consists of two sets 1 and 2 of Y or star-connected capacitors. Each set is shown as a three-phase bank with an equal number of capacitors in each phase. However, the number of capacitors in one set could be increased and still be used in this system. The neutral line 3 from set 1 of Y-connected capacitors and the neutral line 4 from set 2 of Y-connected capacitors are connected by a fuse link or fusible element 5. As clearly indicated in Fig. 2, the fuse link normally holds the resilient spring contacts 7 and 8, which are respectively in series with neutral lines 3 and 4, out of contact with the grounding conductor 9. Since the spring contacts are normally held out of engagement with the conductor 9, the neutral lines 3 and 4 are normally ungrounded and there will be no flow of either fundamental or harmonic currents to ground. However, if a fault occurs in any capacitor, the neutral of that bank will assume up to phase to ground voltage and as a result, current will flow in the neutral interconnecting the capacitor banks and rupture the fuse link 5. When this fusible element functions, both resilient contacts 7 and 8 are released and respectively electrically contact the conductor 9 which is grounded at 6. This will establish a phase to ground fault through the faulted capacitor and interruption of the faulted phase upon blowing the fuse in the faulted phase. The capacitors on the remaining two phases will then operate at normal line to ground voltage.

If the operation of a recloser or cutout should open the three-phase circuit, both neutrals of the capacitor banks will shift in the same direction an equal amount. The capacitors in each phase are arranged in parallel so that an open circuit in any phase will affect all the banks of capacitors evenly and prevent unbalance between the banks. There will be no voltage disturbance between the two capacitor bank neutrals and so the fusible element 5 will not melt. When the open circuit is reclosed, the neutrals will again assume ground potential.

Figure 2:
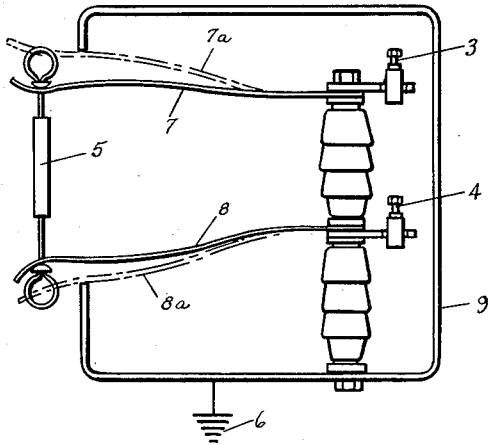
Fig. 2 is a mechanical embodiment of the grounding device shown diagrammatically in Fig. 1.

Fig. 2 shows a simple mechanical embodiment of the protective device including resilient contacts 7 and 8, respectively, connected to the neutrals 3 and 4 of capacitor banks 1 and 2. A fusible element 5 extends between the resilient contacts 7 and 8 and holds them in ungrounded position relative to the conductor 9. When the fusible element 5 blows, it releases the resilient contacts 7 and 8 for biased movement to the positions 7a and 8a in which positions they respectively contact the conductor 9 which is grounded at 6.

A small amperage fuse link is used so that the neutral grounding device can be made sensitive enough to detect and operate on certain unbalances between the banks due to an open or only partially short circuited capacitor of any bank. This will prevent any build-up of excessive voltage on the remaining capacitors in the banks.

Figure 3:
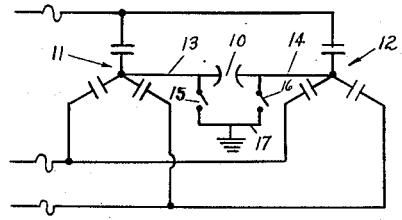
Fig. 3 is an electrical diagram illustrating another method of grounding the neutrals of a plurality of Y-connected capacitor banks.

Fig. 3 is a second diagrammatic arrangement with two Y-connected capacitor banks 11 and 12 having neutrals 13 and 14 and an isolator or gap 10 similar to that disclosed in the patent to Earle, No. 2,315,320, issued March 30, 1943, and assigned to the assignee of this application. When the voltage between the neutrals 13 and 14 reaches a value high enough to spark over the gap or isolator 10, the powder charge within the isolator 10 will explode and release resilient contact 16 for biased engagement with fixed contact 15 and grounding conductor 17 and thus ground the neutrals through the grounding conductor 17.

Figure 4:
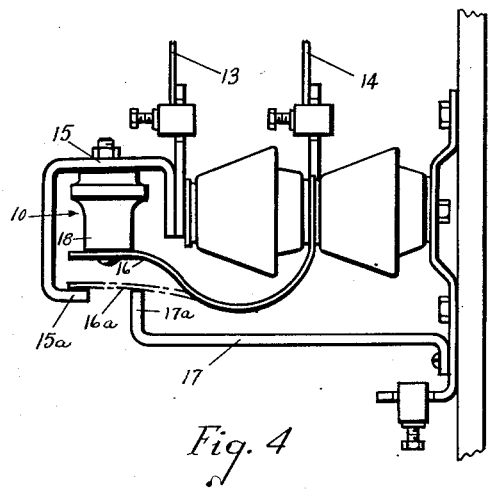
Fig. 4 is a mechanical embodiment of the grounding device shown diagrammatically in Fig. 3.

Fig. 4 is a mechanical embodiment of the grounding device illustrated in Fig. 3 showing the neutrals 13 and 14 connected respectively to the fixed contact arm 15 and resilient contact 16. Contact arm 15 is non-resilient and contact 16 is resilient and biased toward contact with the arm 15 and grounding conductor 17. The resilient contact is normally held in the full line position 16 by means of the isolator 10 which contains the gap more fully disclosed in Fig. 5.

Figure 5:
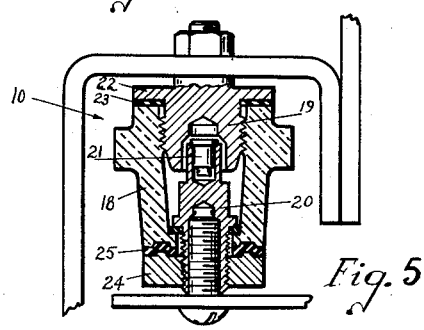
Fig. 5 is an enlarged detail in vertical section of the destructible gap device embodied in Fig. 4.

This restraining means shown in greater detail in Fig. 5 comprises a closed chamber and includes an insulating shell 18 of frangible material which spaces an upper electrode 19 electrically connected to the arm 15 from a lower electrode 20 electrically connected to the contact 16. One of the electrodes, in this instance the lower one 20 is arranged to hold an explosive charge in the form of a cartridge 21 spaced from the electrode 19. The upper electrode is screwed into the upper end of the shell 18 and is provided with a flange 22 which clamps a sealing gasket 23 against the shell. The lower electrode 20 is threaded to receive the nut 24 which clamps a sealing gasket 25 against the lower end of the shell, thus forming a closed chamber within which the spark gap means is located, the gap being disposed between the electrode 19 and the cartridge 21.

It is apparent from the above description that when a certain voltage occurs between the neutrals 13 and 14 spark-over occurs in the gap and causes the explosive charge in the cartridge 21 to ignite and generate pressure internally of the shell 18 sufficient to burst the shell and thus release the lower spring contact 16. The spring contact 16 will immediately move into firm engagement with an inwardly projecting lower end 15a on the contact arm 15 and with the vertical portion 17a on the ground conductor 17 as shown in the dash-dot lines of Fig. 4. Thus, it can be seen that when the voltage between the neutrals reaches a certain magnitude, the neutrals are immediately connected to ground which results in the blowing of the fuse on the faulted phase and removing the capacitors in that phase from the system.

Figure 6:
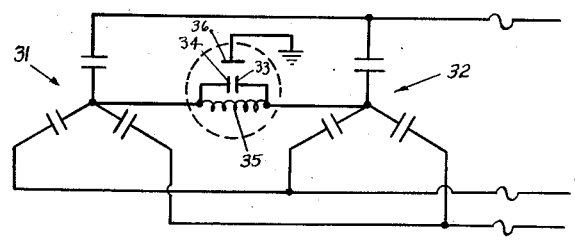
Fig. 6 is an electrical diagram illustrating still another method of grounding the neutrals of a plurality of Y-connected capacitor banks.

Fig. 6 is a third diagrammatic arrangement with two Y-connected capacitor banks 31 and 32 having neutrals 33 and 34 forming a normally open gap 38 and connected serially through a solenoid coil 35. On the occurrence of a predetermined current in the solenoid coil, a contact rod 36 is released for closing the gap between the neutrals and connecting them to ground.

Figure 7:
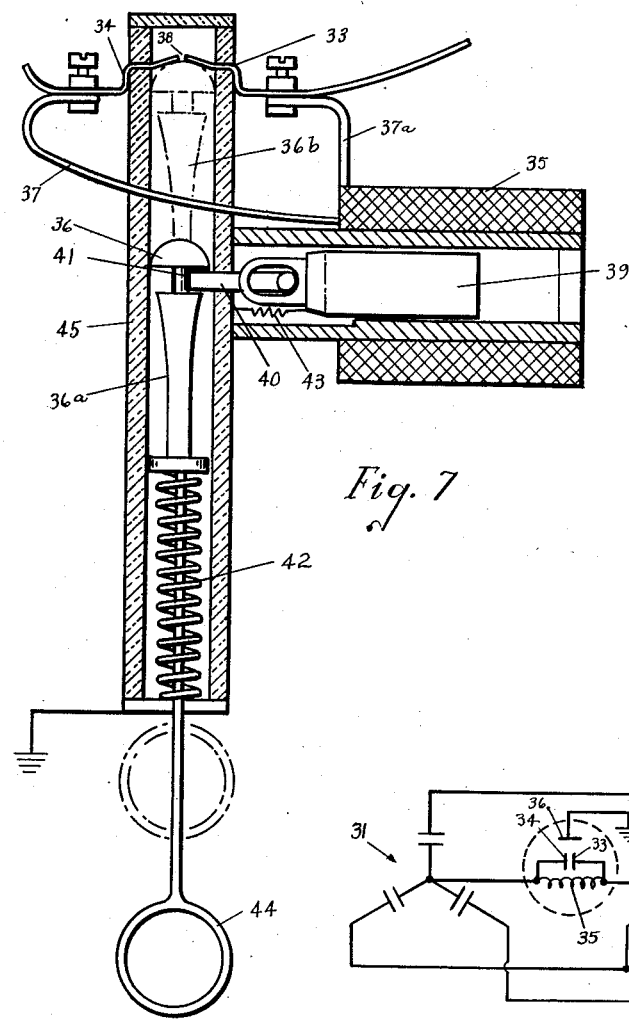
Fig. 7 is a sectional view of a mechanical embodiment of the grounding device shown diagrammatically in Fig. 6.

The grounding device may be designed as illustrated in Fig. 7 in the form of a contact rod 36 conductively connected to ground through a spring 42 slidably mounted in housing 45. The neutrals 33 and 34 have leads 37 and 37a forming a circuit through the solenoid coil 35. If the current through the solenoid coil 35 reaches a certain magnitude, it will draw a plunger 39 inwardly of the solenoid and after a certain free travel will engage and pull the trigger 40 out of the annular recess 41 in the contact rod 36. The contact rod 36 is then free for biased movement by the spring 42 upwardly in the housing 45. When the contact rod 36 reaches its upper position indicated by dot dash lines 36b, it contacts the neutrals 33 and 34 thus grounding the neutrals 33 and 34 through the contact rod 36 and spring 42.

The contact rod 36 is provided in its mid portion with a longitudinally extending tapered portion 36a on which the trigger 40 rides as the rod moves vertically during resetting of the rod until the rod reaches the place where the trigger 40 can enter the annular recess 41 and again hold the rod in the ungrounding position.

The neutrals will remain grounded until it is desired to isolate them again after the faulty capacitor has been replaced. When the faulty capacitor has been replaced, the voltage unbalance between the neutrals 33 and 34 will no longer exist. The plunger 39 is then free to respond to a spring 43 which urges it toward the contact rod 36.

To place the neutrals in an ungrounded condition, the contact rod 36 is pulled downwardly out of contact with the neutrals by means of a switch stick (not shown) engaging a loop 44 attached to the contact rod 36. The trigger 40 will ride along the tapered portion 36a of the contact rod 36 and slip into the recess 41 of the contact rod and latch the rod against movement by the spring 42. The grounding device is then operative to ground the neutrals whenever a fault or unbalance occurs again.

Thus, it can be seen that the novel arrangement herein disclosed for grounding a plurality of normally ungrounded star-connected capacitor banks provides an effective and economical method of reducing harmonic interference and also provides protection to the capacitor banks upon failure of any capacitor therein. The neutral lines of widely separated star-connected capacitor banks can be extended to a given desirable location for connection with the novel grounding apparatus herein disclosed.

By placing the neutrals in an ungrounded position the electric distribution companies can give better service and with the protective system and grounding apparatus herein disclosed are able at the same time to protect expensive equipment in case of a fault in any capacitor. Our novel arrangement for grounding a plurality of ungrounded capacitor bank neutrals is greatly to be desired in distribution lines and solves a long existing problem which has heretofore prevailed.

We claim:

1. In a polyphase electric system having a grounded neutral conductor; at least two groups of star-connected capacitors connected to the system and having their neutral points normally at the same potential and isolated from the system neutral, a line fuse in each phase of said system in series relation with corresponding paralleled legs of the respective star-connected groups, a solenoid connected between said neutral points, a releasable grounding means biased for grounding both of said neutral points when released, latching means normally restraining said grounding means against biased movement and responsive upon energization of said solenoid for withdrawal from restraining position, said energization occurring on failure of a capacitor in either of said groups resulting in an unbalanced condition to exist between said groups and a current to flow through said solenoid between said neutral points, whereby grounding of said neutral points will cause rupture of the line fuse connected to said failed capacitor and removal of the corresponding leg of each star-connected group from the electrical system.

2. In a polyphase electric system having a grounded neutral conductor; at least two groups of star-connected capacitors connected to the system in parallel relation and having their neutral points normally at the same potential and isolated from the system neutral, a line fuse in each phase of said system in series relation with corresponding paralleled legs of the respective star-connected groups, and an arc-gap device including an explosive element electrically connected in series with said neutral points, said explosive element being adapted to detonate upon the conduction of a predetermined current across said gap, and means controlled by said device and operative upon detonation of said explosive element to connect both of said neutral points to ground.

3. In a polyphase electric system having a grounded neutral conductor; at least two groups of star-connected capacitors connected to the system in parallel relation and having their neutral points normally at the same potential and isolated from the system neutral, a line fuse in each phase of said system in series relation with corresponding paralleled legs of the respective star-connected groups, a first stationary terminal connected to one of said neutral points, a grounded stationary terminal isolated from said first terminal, a tensioned contact arm connected to the other of said neutral points and having a first and second position, said arm when in said second position electrically contacting sair first terminal and said ground terminal, and means including an arc gap device having an explosive element electrically connected in series between said first terminal and said contact arm and normally holding said contact arm under tension in said first position out of contact with said ground terminal and said first terminal, said explosive element being adapted to detonate upon conduction of a predetermined current across said gap to release said tensioned contact arm.

4. In a polyphase electric system having a grounded neutral conductor; at least two groups of star-connected capacitors connected to the system and having their neutral points normally at the same potential and isolated from the system neutral, a line fuse in each phase of said system in series relation with corresponding paralleled legs of the respective star-connected groups, a control device consisting of a solenoid coil electrically connected between said neutral points, a grounded conductive plunger normally held in one position, spring means biasing said plunger for movement to a second position, and releasable locking means normally holding said plunger in said one position, said locking means being responsive to the energization of said solenoid coil to release said grounded plunger, said grounded plunger when released moving to said second position and electrically connecting both of said neutral points to ground.

5. In a polyphase electrical system including a plurality of phase conductors, grounded neutral conductor, at least two groups of star-connected capacitors connected to said phase conductors in parallel relation with each other, the neutral point of each respective capacitor group normally being at the same electrical potential and each neutral point being normally electrically isolated from the grounded system neutral conductor, and a line fuse in each phase conductor in series relation with corresponding paralleled legs of the respective star-connected groups; a grounding device having current sensitive means interposed between and electrically connected with each of said neutral points and operable in response to a voltage difference which occurs between said neutral points when a capacitor in either of said groups fails and including connecting means operated to connect both of said neutral points to ground when said current sensitive means responds to said voltage difference, whereupon the line fuse in series with the failed capacitor will rupture to remove the corresponding leg of each star-connected group from the electrical system.

6. In a polyphase electrical system including a plurality of phase conductors, a grounded neutral conductor, a fuse in each said phase conductor, two groups of star-connected capacitors connected to said phase conductors in parallel relation to each other and each having its neutral normally isolated from the system neutral; a grounding device comprising biased means for connecting the neutrals of both of said groups to the system neutral and normally held against said bias in a position to isolate the neutrals of both of said groups from the system neutral and current sensitive means connected between the neutrals of said groups normally holding said connecting means in said position, said grounding device being responsive to the flow of a predetermined current through said current sensitive means incident to the failure of a capacitor in either of said groups to release said biased connecting means to connect the neutrals of both of said groups to the system neutral.

7. In a polyphase electrical system including a plurality of phase conductors, a grounded neutral conductor, a fuse in each phase conductor, two groups of Y-connected capacitors connected to said phase conductors in parallel relation to each other and each having its neutral point normally isolated from the system neutral; a control device connected between the neutral points of said groups and responsive to the failure of a capacitor in either of said groups to effect rupture of the fuse in the phase to which said failed capacitor is connected comprising three electrical contacts normally isolated from each other, at least one of said contacts being movable to electrically connect all of said contacts and being normally biased in a direction to connect said contacts, one of said contacts being connected to the system neutral and the other two contacts being each connected to the neutral point of one of said groups, and current sensitive means connected between said neutral points and normally holding said movable contact in a position with said contacts isolated, said current sensitive means being responsive to a difference in potential between said neutral points incident to the failure of capacitor in either of said groups to release said movable contact to electrically connect all of said contacts.

8. In a polyphase electrical system including a plurality of phase conductors, a grounded neutral conductor, at least two groups of Y-connected capacitors connected to said phase conductors in parallel relation with each other, the neutral points of said capacitor groups normally being at the same electrical potential and each neutral point being normally isolated from the system grounded neutral conductor, and a line fuse in each phase conductor in series relation with corresponding paralleled legs of the respective Y-connected groups; a grounding switch including a stationary contact connected to ground and movable contacts each connected respectively to one of said neutral points and biased toward engagement with said stationary contact, and a fusible element interposed between and electrically connected to said neutral points of said groups and normally restraining said movable contacts from connection with said stationary contact, said fusible element being adapted to rupture in response to a predetermined potential between said neutral points occurring upon failure of a capacitor in either of said groups and release said movable contacts for engagement with said stationary contact, whereupon the line fuse connected to said failed capacitor will rupture to remove the corresponding leg of each Y-connected group from the electrical system.

9. In a polyphase electrical system having a grounded neutral conductor; at least two groups of Y-connected capacitors connected to the system in parallel relation with each other, the neutral points of said capacitor groups being at the same electrical potential and each neutral point being normally electrically isolated from the grounded system neutral conductor, a line fuse in each phase of said system in series relation with corresponding paralleled legs of the respective Y-connected groups, a grounding control device electrically connected between said neutral points and responsive to voltage differential between said neutral points occurring on failure of a capacitor in either of said groups to effect connecting both of said neutral points to ground, said device including a first stationary contact connected to ground, a second stationary contact connected to one of said neutral points, and a movable contact connected to the other of said neutral points and engageable with said first and second stationary contacts, whereby operation of said grounding device will rupture the line fuse connected to said failed capacitor and remove the corresponding leg of each Y-connected group from the electrical system.

References Cited in the file of this patent

UNITED STATES PATENTS

| | | |
|---|---|---|
| 1,730,858 | Marbury | Oct. 8, 1929 |
| 2,157,886 | Cuttino | May 9, 1939 |
| 2,371,496 | Bennett | Mar. 13, 1945 |
| 2,572,637 | Lincks | Oct. 23, 1951 |

OTHER REFERENCES

"Bank of Capacitors Reinforces 132–KV. Grid"—L. F. Ferri, C. S. Dayton, Electrical World, pp. 66–69, March 29, 1947.

Abstract Serial No. 65,705, Cramer, January 31, 1950, 630 O. G. 1321.